United States Patent [19]

Morris et al.

[11] Patent Number: 4,549,241

[45] Date of Patent: Oct. 22, 1985

[54] GROUND AND TEST ARRANGEMENT FOR A GROUND FAULT CIRCUIT INTERRUPTER

[75] Inventors: Robert A. Morris; George W. Kiesel, both of Burlington; Paul T. Rajotte, Plainville, all of Conn.

[73] Assignee: General Electric Company, New York, N.Y.

[21] Appl. No.: 579,626

[22] Filed: Feb. 13, 1984

[51] Int. Cl.[4] .......... H02H 3/347

[52] U.S. Cl. .......... 361/45; 361/115; 361/394; 361/399

[58] Field of Search .......... 361/44, 45, 46, 115, 361/394, 399; 174/51, 53, 55, 56, 66; 335/18

[56] References Cited

U.S. PATENT DOCUMENTS

| | | | |
|---|---|---|---|
| 3,353,065 | 11/1967 | Bassani | 361/45 X |
| 4,001,652 | 1/1977 | Klein et al. | 361/45 X |
| 4,247,840 | 1/1981 | Cooper et al. | 335/18 |
| 4,295,181 | 10/1981 | Chang et al. | 361/394 X |
| 4,314,304 | 2/1982 | Baumbach | 361/124 |

*Primary Examiner*—Patrick R. Salce

*Attorney, Agent, or Firm*—Richard A. Menelly; Walter C. Bernkopf; Fred Jacob

[57] ABSTRACT

A ground fault circuit interrupter (GFCI) yoke with integral grounding screw and simple staked ground receptacle stab arrangement provides the device grounding features. The mounting screws that are attached to the yoke by means of staples provide a wall box self-grounding feature. A push-to-test arrangement is provided by a neutral strap and test contact attached to the line receptacle stab through a current limiting resistor. Depressing a test button energizes the test circuit by electrically connecting the test contact with the neutral strap. The combination of the line and neutral receptacle stabs with the line and neutral moveable contact arms and the arrangement of the receptacle stabs in alignment with the receptacle plug-in slots allows the push-to-test and interrupter contacts to be assembled within the GFCI enclosure without additional wiring.

17 Claims, 9 Drawing Figures

PRIOR ART

PRIOR ART 99
100
96
97
120
91
64
98
102
101
121
92
95
94
63
91
93
92
93
95
94
110
125
103
90
89
108
62
111
107
109
105
106
160
103
124
118
104
128
72
123
119
71
129
117
115
116
57
158
156
60
112
122
131
157
55
61
56
87
88
130
155
56
73
59
58
74

GROUND AND TEST ARRANGEMENT FOR A GROUND FAULT CIRCUIT INTERRUPTER

BACKGROUND OF THE INVENTION

Ground fault circuit interrupting (GFCI) devices, as currently available, are capable of interrupting fault current in the range of 4 to 6 milliamps. Circuits for such devices are described in U.S. Pat. Nos. 4,345,289 and 4,348,708, both of which are in the name of Edward K. Howell. The circuits described therein basically include a current sensor or magnetics, a signal processor or electronics and an electronic switch. The magnetics consist of a differential current transformer which responds to a current imbalance in the line and neutral conductors of the distribution circuit. This current imbalance is amplified by the signal processor pursuant to triggering the electronic switch and thereby complete an energization circuit for the trip solenoid. The current sensor also includes a neutral excitation transformer for responding to a ground fault on the neutral conductor.

A mounting arrangement for the GFCI device is described in U.S. Pat. Nos. 3,950,677 and 4,001,652 to Keith W. Klein et al. In the Klein et al. GFCI device, the signal processor electronics is carried on a printed wire board and is positionally mounted and retained in one shell compartment of a GFCI receptacle casing. The magnetics are positionally mounted in another shell compartment within the receptacle and are locked in place by the insertion of single turn transformer winding elements. This GFCI assembly, although compact, does not readily lend to a fully automated assembly process since the magnetics contain two separate transformers which require electrical interconnection with each other as well as with the circuit electronics. To date, the electrical interconnection of the magnetics with the electronics has accounted for a good percentage of the time involved in the GFCI assembly process.

The grounding and push-to-test arrangement for the Klein et al. GFCI device is fully described within U.S. Pat. No. 4,010,432, also in the name of Keith W. Klein et al., which patent is incorporated herein for purposes of reference. This patent discloses means for attaching the faceplate yoke to the case for providing connection with system ground through a ground receptacle slot. Also disclosed is an arrangement for providing push-to-test facility whereby depression of a test button causes simulated ground leakage current to flow and to trip and deenergize the receptacle sockets. Reference to this patent should be made for a more complete description of the state of the art of ground and test arrangements for GFCI devices.

The purpose of this invention is to provide a combination receptacle stab-interrupter moveable contact and push-to-test arrangement for automated assembly within a GFCI housing without wires or braids, and also to provide a plug-on integral grounding yoke with self-grounding features.

SUMMARY OF THE INVENTION

The invention comprises a GFCI device adapted for robotic assembly by means of a unitary receptacle stab and moving contact arm arrangement for both the line and neutral connections. A push-to-test assembly is connected to the neutral terminal through a current limiting resistor and a flexible conductor strap. Installation of the GFCI device within the wall outlet box electrically connects the wall box with the GFCI ground. Retainer-staples serve to both retain the yoke attaching screws and to maintain good electrical connection between the screws and the yoke, as well as provide the ground connection between the outlet box and the GFCI device.

GENERAL DESCRIPTION OF THE INVENTION

Figure 1:
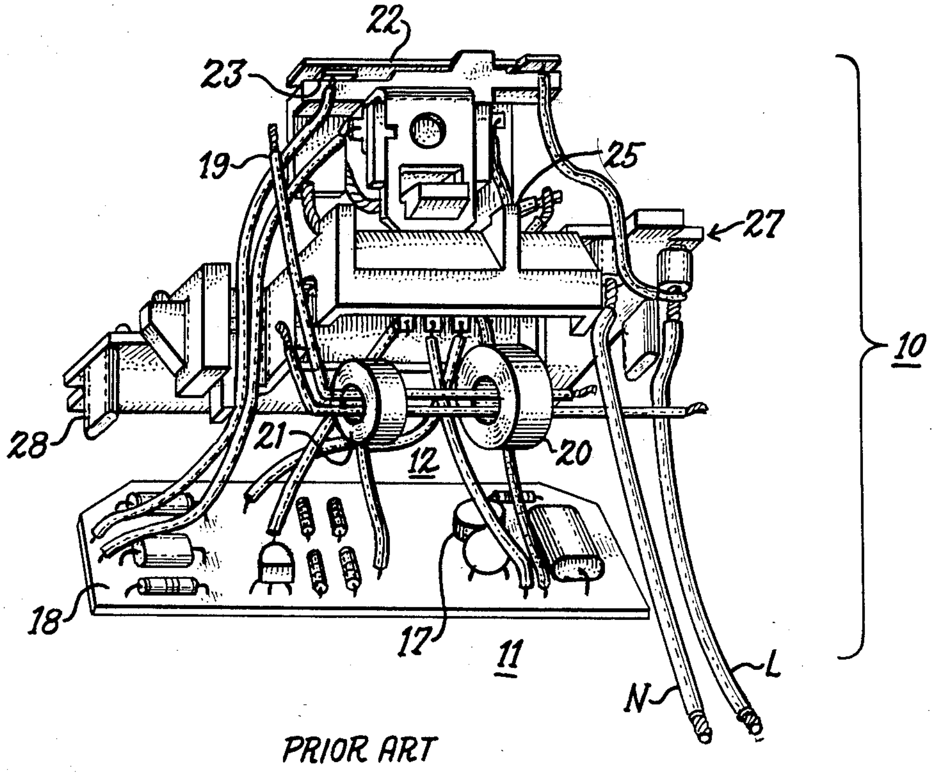
FIG. 1 is a front perspective view of a GFCI assembly according to the prior art.
Figure 2:
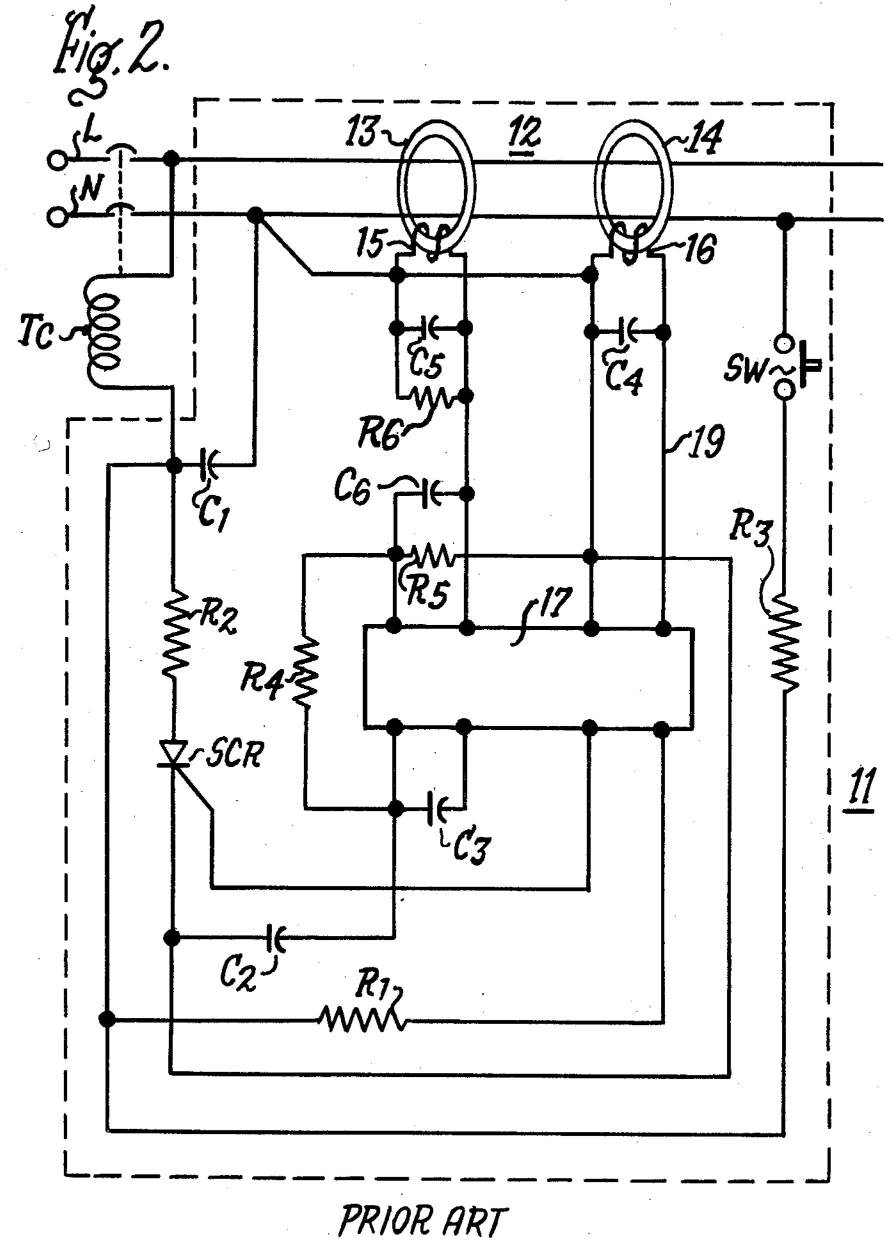
FIG. 2 is an electrical schematic of the signal process electronics used within the GFCI of FIG. 1.

The electrical interconnect arrangement for allowing plug-in of a magnetic sensor module within an automated GFCI device can be better understood by referring first to the state of the art GFCI device 10 depicted in FIG. 1 and the electronics module 11 depicted in FIG. 2. The electronics module is described in detail in the aforementioned patents to Howell which are incorporated herein for purposes of reference. The magnetics 12 consists of a differential current transformer core 13 and a neutral transformer core 14 for encircling the line and neutral conductors L, N. The differential transformer secondary winding 15 and the neutral excitation transformer secondary winding 16 interconnect with an amplifier chip 17 for amplifying the ground fault currents detected and for operating an SCR and trip coil solenoid TC to open the switch contacts. A plurality of discrete circuit elements such as capacitors $C_1$–$C_6$ and resistors such as $R_1$–$R_6$ are required for current limitation and noise suppression. A test switch SW is used for directly connecting the trip coil solenoid through a current limiting resistor, such as $R_3$, whereby the circuit between the line and neutral conductors is complete and the switch contacts are opened to test the circuit.

The arrangement of the electronics module 11 within the prior art GFCI device 10 is provided by means of a printed wire board 18 which carries the discrete elements such as the resistors, capacitors, SCR and the amplifier chip 17. The electronics module 11 is interconnected with the magnetics 12 by means of a plurality of wires generally indicated as 19. The magnetics consisting of differential current transformer 21, containing core 13 and winding 15, and neutral excitation transformer 20 containing core 14 and winding 16, are secured to the underside of a mounting platform 27. The line and neutral conductors L, N connect with the magnetics 12, electronics module 11 and with the switch SW consisting of movable and fixed contacts 22, 23 supported on the mounting platform 27 by means of a pedestal 25. The TC solenoid is mounted subjacent the movable and fixed contacts 22, 23 and operates to open the contacts upon the occurrence of ground fault current through either or both of the transformers. Four posts 28 depending from the bottom of the mounting platform 27 provide requisite clearance between the mounting platform and the bottom case (not shown) of the device for the printed wire board 18.

It was determined that by concentrically arranging the differential current transformer 21 and the neutral excitation transformer 20 in a compact assembly around a common aperture, the pedestal 25 and mounting platform 27 could be eliminated and the magnetics 12 could then be directly mounted to the printed wire board 18 eliminating the connecting wires 19. Further, the line and neutral conductors L, N could be sensed by tubular conductors through the assembly aperture, without the need for passing the conductors through the centers of the neutral excitation and differential current transformers as with the prior art.

DESCRIPTION OF THE PREFERRED EMBODIMENT

Figure 3:
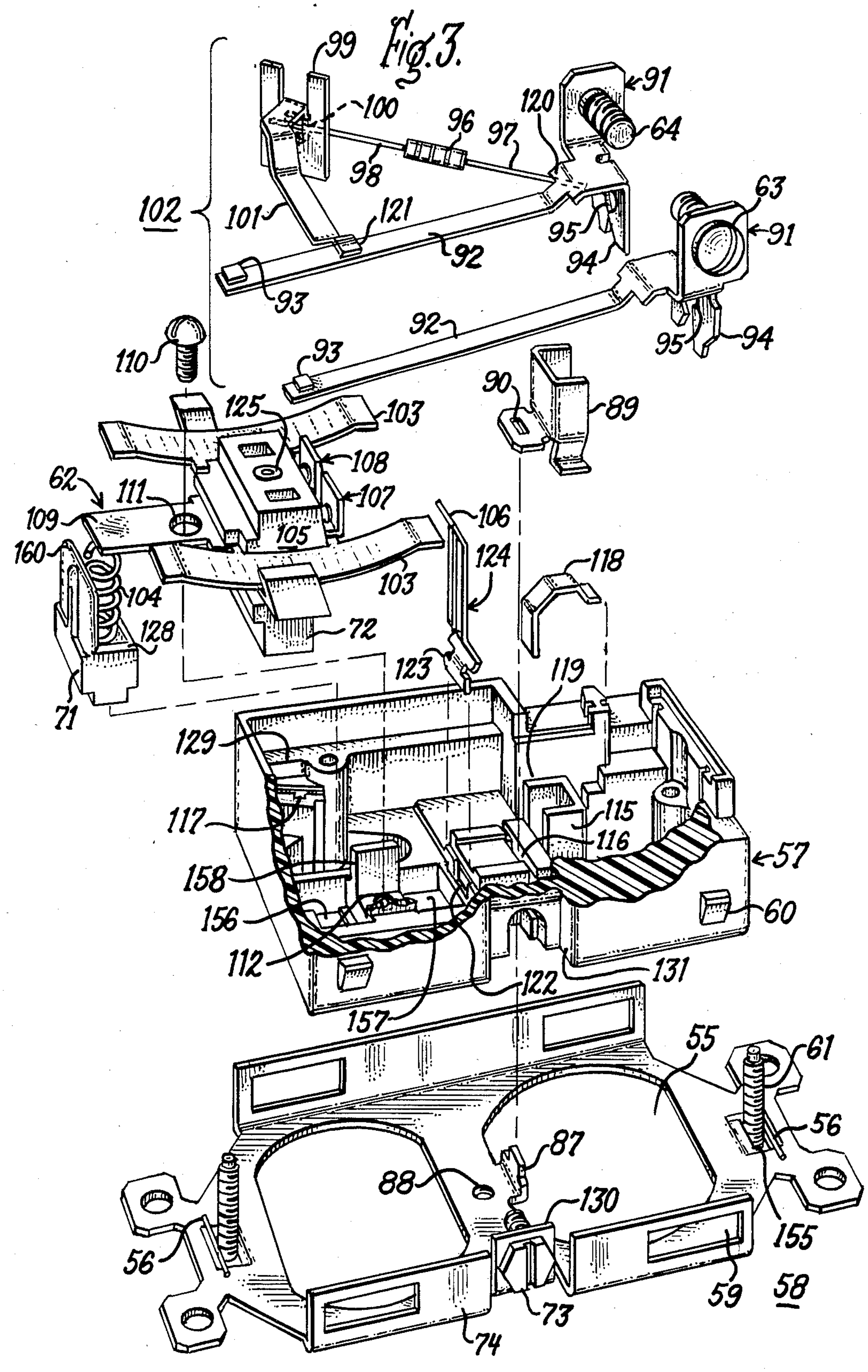
FIG. 3 is an exploded top perspective view of the push-to-test assembly and operating mechanism assembly prior to insertion within the GFCI case.
Figure 7:
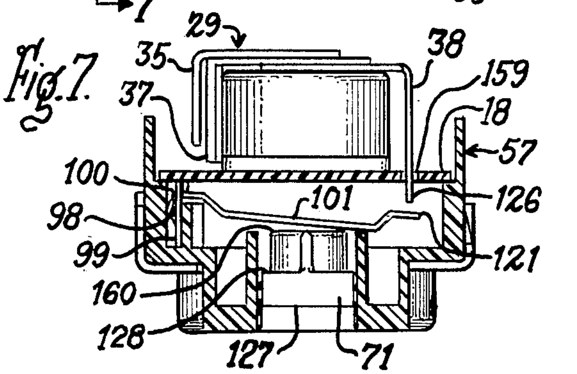
FIG. 7 is an end view of the GFCI case depicted in FIG. 6 in partial section.
Figure 8:
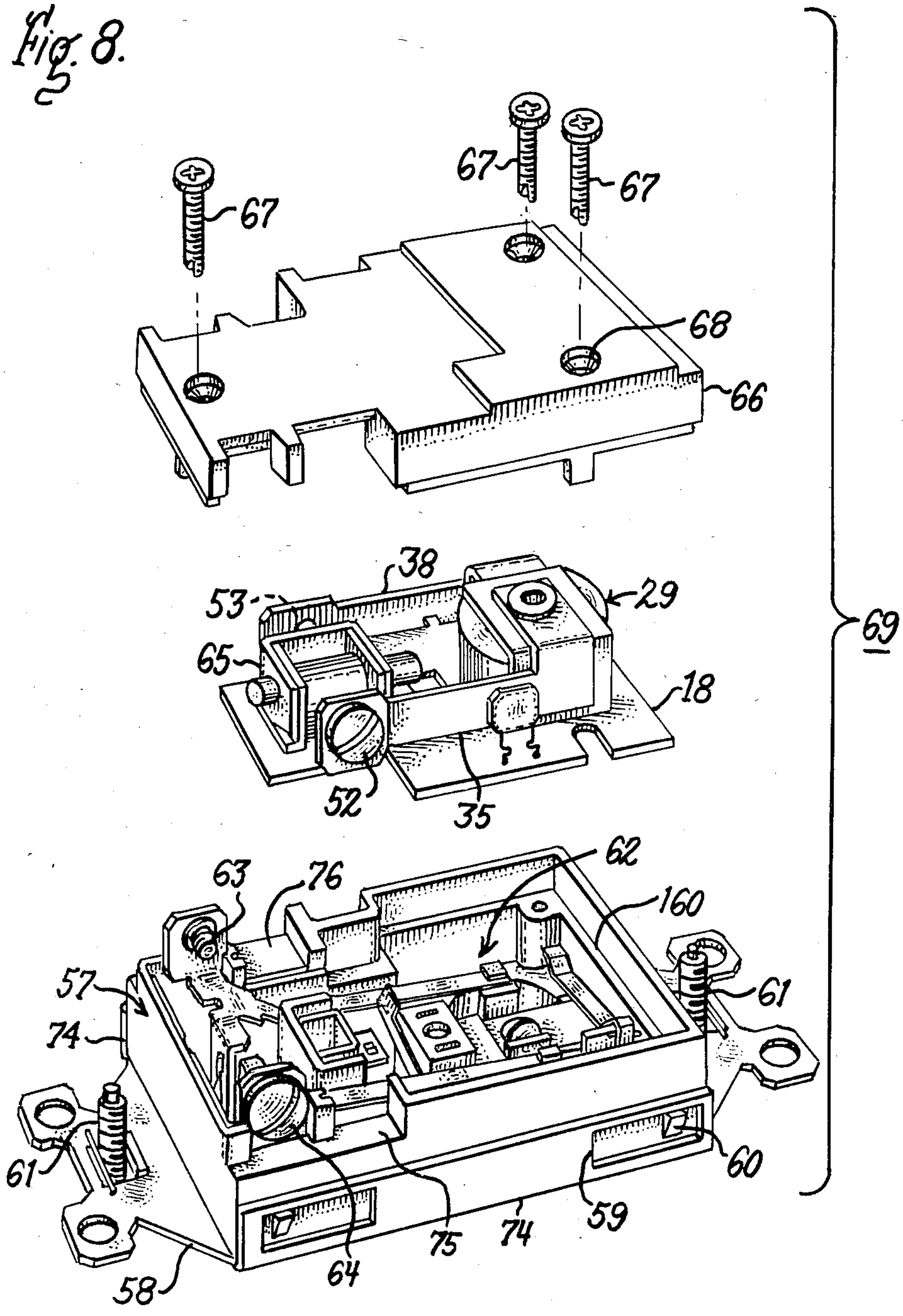
FIG. 8 is an exploded top perspective view of the GFCI components prior to assembly.
Figure 9:
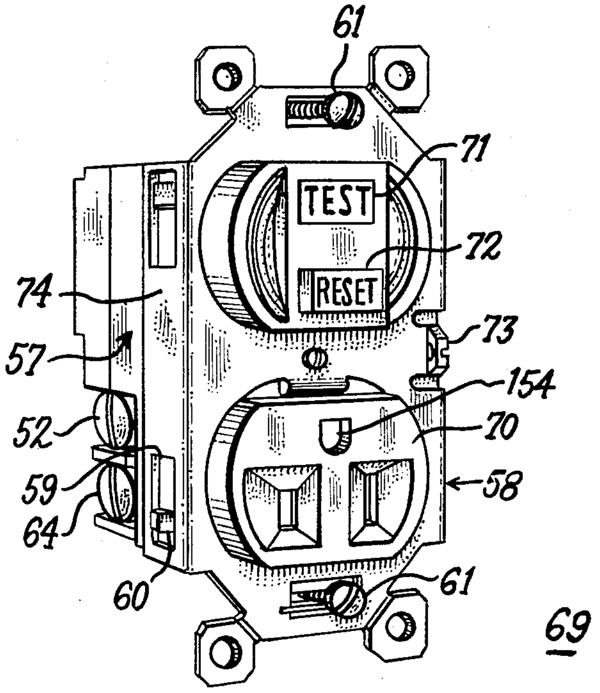
FIG. 9 is a front perspective view of the GFCI components completely assembled.

The receptacle stab and contact unit 91 is shown in FIG. 3 consisting of a moveable contact arm 92 supporting a contact 93 at one end, and a load neutral terminal screw 63 along with a receptacle stab 94 at an opposite end. The receptacle stab has a keyhole-shaped slot 95 for receiving the neutral prong of a standard electrical plug. A similar receptacle stab and contact unit containing the load line terminal screw 64 also connects with a current limiting shorting resistor 96 by means of an angled surface 120 on one side of the receptacle stab 94 which captures one of the resistor leads 97 and forces it against a portion of the GFCI case when the receptacle stab and contact unit 91 is inserted within the case. This provides good electrical connection between the resistor lead 97 and the receptacle stab 94. The other resistor lead 98 is pressed within a lanced tab 100 formed within a contact plate 99. The conductive strap 101 formed integrally with the contact plate 99 carries a contact tip 121 at an opposite end for engaging with the contact end 126 of the line neutral connecting strap 38 as shown in FIG. 7. A ground contact stab 89 is arranged within a support 115 formed within the case 57 such that a ground stake tab 87 formed within the yoke or faceplate 58 extends within a slot 90 through a bottom portion of the contact stake when the yoke is attached to the case. With the ground contact stab 89 secured within the case 57, the ground stake tab 87 through slot 90 is staked to provide a good mechanical and electrical connection with the yoke 58. This arrangement also allows ground connection between the ground prong of a conventional grounded plug connector when inserted within the ground outlet slot 154 as best seen in FIG. 9. By positioning the ground contact stab 89 with respect to the opening 55 through the yoke 58, the grounding plug contacts the ground contact stab 89. The yoke 58 is fastened to the case 57 by inserting the yoke over the bottom portion of the case and forcing the slots 59 formed in the plate side rails 74 over the corresponding projections 60 formed in the case 57. A pair of mounting screws 61 inserted through a corresponding pair of slots 155 within yoke 58 serve to mount and electrically connect the completed GFCI device to the customer wall outlet box as well as to provide a good electrical ground connection. Electrically conductive staples 56 through the yoke at each end multifunctionally serve to hold the mounting screws 61 in good electrical contact with the yoke and customer outlet box as well as to retain the mounting screws within the slots 155. The attachment of the yoke 58 to the case 57 is best seen by referring to FIG. 8.

Electrical connection with the customer service ground is made by means of ground terminal screw 73 and ground terminal screw tab 130 integrally formed within one of the yoke side rails 74. The spring clip 118 which is inserted within a cavity 119 formed within case 57 is positioned under the receptacle stab and contact unit 91 and resistor lead 97 to promote good electrical connection between the resistor lead and the receptacle stab angled portion 120. Trip lever 124 is located within the case by inserting the pivot end 123 of the trip lever within a cavity 122 formed within the case. The solenoid contact end 106 of the trip lever interacts with the solenoid plunger tip 150 shown in FIG. 6 in the manner described in U.S. patent application Ser. No. 579,627, filed Feb. 13, 1984 and entitled "Interrupter Mechanism For A Ground Fault Circuit Interrupter", which application is incorporated herein for purposes of reference. The operating mechanism 62 consisting of a mechanism crossarm 105 supporting a main latch 107 and a reset latch 108 is positioned between a pair of contact arm springs 103. A latch plate 109 is secured within the case between a pair of pedestals 158 by means of screw 110 extending through a screw hole 111 in the plate and threadingly engaging screw hole 112 in the bottom of the case. The test button 71 contains a button stop 127 for maintaining the button in a reset position when the button is inserted through the opening 156 in the bottom of case 57 and a stop 128 for maintaining the button in its test position. The test button reset spring 104 biases the test button against the latch plate 109. A detailed explanation of the operating mechanism 62 is given within the aforementioned U.S. patent application.

Figure 4:
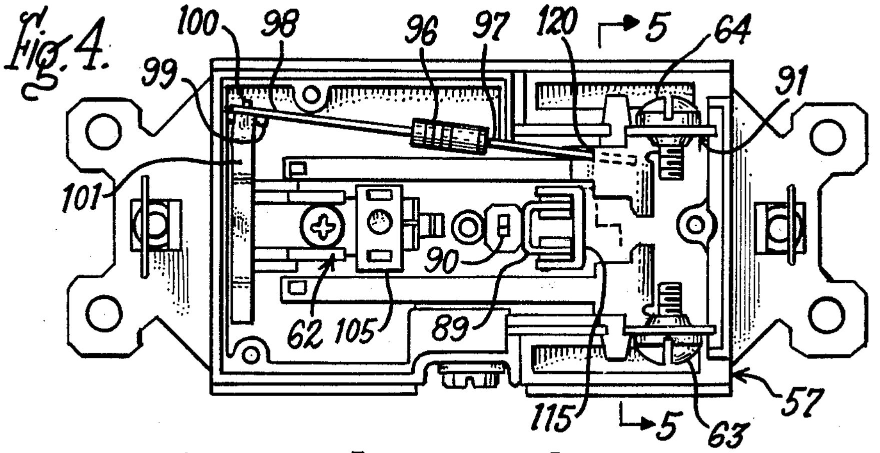
FIG. 4 is a top view of the GFCI case with the push-to-test and operating mechanism of FIG. 3 inserted therein.
Figure 5:
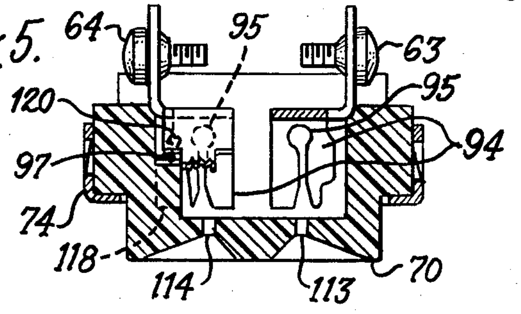
FIG. 5 is a sectional view through the GFCI assembly depicted in FIG. 4.
Figure 6:
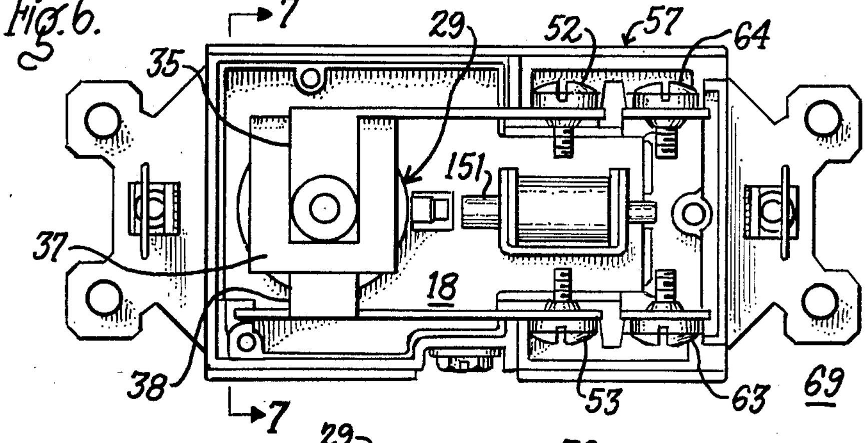
FIG. 6 is a top view of the GFCI case depicted in FIG. 4 with the printed wire board assembly positioned over the push-to-test assembly and the operating mechanism.

FIG. 4 shows the push-to-test assembly 102 within the case along with the operating mechanism 62. The test resistor 96 is shown connected with receptacle stab and contact unit 91 at the receptacle stab angled portion 120 by means of lead 97 and with the contact plate 99 by means of lanced tab 100. When the completely assembled GFCI device 69 depicted in FIG. 6 is connected with the customer's outlet box, electrical connection is made by means of load line terminal screw 64 and load neutral terminal screw 63 with the customer service. FIG. 5 shows the arrangement between the receptacle stabs 94 and the load line terminal screw 64 and load neutral terminal screw 63 immediately adjacent the GFCI outlet 70. Electric connection is made through the neutral outlet slot 113 and the keyhole-shaped receptacle slot 95 with load neutral terminal screw 63 and through line outlet slot 114 and the keyhole-shaped receptacle slot 95 with the load line terminal screw 64. Also shown is the spring clip 118 which sandwiches the test resistor lead 97 between the receptacle stab angled portion 120 and the case.

The operation of the push-to-test function can be seen by referring to FIGS. 6 and 7 as follows. The magnetic sensor plug-in subassembly 29 which is fully described in U.S. patent application Ser. No. 579,336, filed Feb. 14, 1984, and entitled "Electrical Interconnect Arrangement For A GFCI Magnetic Sensor Module Plug-In Subassembly", is supported within the case 57 by means of printed wire board 18 and the contact end 126 of line neutral connecting strap 38 extends through a slot 159 in the printed wire board 30. This application is incorporated herein for purposes of reference and should be referenced for a more complete description of the push-to-test function. The line line connecting strap 35 is insulated from the line neutral connecting strap 38 by means of an insulating ferrule 37. As best seen in FIG. 8, the line neutral connecting strap 38 is connected with the customer neutral service by means of line neutral terminal screw 53. When the test button 71 is depressed, the conductive strap 101 is deflected, bringing the contact tip 121 into contact with the contact end 126 of the line neutral connecting strap 38. This completes the circuit by connection through contact plate 99, lanced tab 100 and resistor lead 98 and the test resistor 96, resistor lead 97 and receptacle stab 94 to the customer service load line via load line terminal screw 64 as described earlier. The button stop 128 interferes with latch plate 109, best seen in FIG. 3, to limit the travel of the test button during testing and the stop 127 interferes with a portion of the case to limit the travel of the test button under the return force provided by the return spring 104 also shown in FIG. 3. The surface 160 on the test button is of an insulating material as well as the test button itself for safety reasons.

The case 57 with the push-to-test components and the interrupter mechanism components is shown in FIG. 8. The printed wire board 18 containing the magnetic sensor subassembly 29 and trip solenoid 65 is next inserted by supporting the printed wire board on a ridge 160 formed within the case. Finally, the cover 66 is placed over the case and attached thereto by means of screws 67 and screw receiving holes 68.

The completely assembled GFCI device 69 is shown in FIG. 9 with the test button 71 and reset button 72 arranged above the single outlet receptacle 70 which extends through the yoke 58. Both the line line terminal screw 52, load line terminal screw 64 and ground screw 73 are conveniently accessible for electrical connection. It is thus seen that an automated assembly process for GFCI devices is made possible by positioning the magnetic sensor module subassembly 29 within the printed wire board 18 prior to connection with the mechanism assembly 62 already assembled within case 57 as depicted in FIG. 8. The configuration and order of assembly of the components within the push-to-test assembly 102 and the ground connection components such as the ground contact stab 89 and grounding stables 86 as depicted in FIG. 3 provide for the electrical interconnection between these components without the need for any additional wires. This is an important feature in allowing the entire GFCI assembly process to become automated.

We claim:

1. A ground fault circuit interrupter comprising:
   - a molded plastic case having external projections formed on opposite sides of said case;
   - a trip solenoid and a signal processor circuit within said case;
   - an operating mechanism within said case for separating a pair of fixed and moveable contacts in response to said signal processor circuit and said solenoid;
   - a slotted ground contact stab mounted within a support formed within said case;
   - a faceplate yoke having a pair of slotted side rails formed integral with and perpendicular to an apertured plate, said side rails being attached to said case by capturing said external case projections within said side rail slots,
   - a ground stake tab formed integral with and perpendicular to said apertured plate and extending through said contact stab slot to provide electrical and mechanical connection between said yoke and said ground stab; and
   - a grounding screw tab formed integral with and perpendicular to said apertured plate for providing external ground connection with said yoke.

2. The circuit interrupter of claim 1 wherein said apertured yoke plate includes a pair of outlet openings and a pair of attaching slots outboard of said outlet openings.

3. The circuit interrupter of claim 2 further including a pair of attaching screws within said attaching slots, said attaching screws being retained within said attaching slots by means of electrically conducting staples.

4. The circuit interrupter of claim 1 wherein said grounding screw tab is recessed from one of said side rails.

5. The circuit interrupter of claim 2 wherein said ground stab is arranged proximate one of said outlet openings to provide removeable connection with system ground by connection with said ground stab through said one outlet opening.

6. The ground fault circuit interrupter of claim 1 wherein said grounding screw tab is arranged intermediate a pair of said side rail slots.

7. The ground fault circuit interrupter of claim 6 wherein said ground screw tab is immediately adjacent said ground stake tab.

8. The circuit interrupter of claim 1 wherein said faceplate yoke further includes an integral grounded wall plate screw receiving means for providing ground connection between said wall plate and said yoke upon attachment.

9. A ground fault circuit interrupter comprising:
   - a molded plastic case carrying an apertured faceplate yoke having means for retaining an outlet;
   - a trip solenoid and a signal processor circuit within said case;
   - an operating mechanism within said case for separating a pair of fixed and moveable contacts in response to said signal processor circuit and said solenoid; and
   - a pair of receptacle contact members, each carrying one of said moveable contacts at one end of one of a pair of moveable contact arms, and terminal means at an opposite end for providing electrical connection with said one moveable contact, each of said receptacle contact members further including a receptacle stab extending from said terminal means proximate said outlet openings to provide means for removeable connection with an electrical plug inserted within said outlet openings.

10. The circuit interrupter of claim 9 including a conducting strap proximate said pair of receptacle contact members to provide temporary connection with said receptacle contact members through a shorting resistor.

11. The circuit interrupter of claim 10 further including a lanced plate mounted within a cavity in said case and carrying said conducting strap.

12. The circuit interrupter of claim 11 wherein said shorting resistor contains first and second resistor leads, said first resistor lead being electrically connected with one of said receptacle contact members and said second resistor lead being electrically connected with said conducting strap.

13. The circuit interrupter of claim 12 wherein said first resistor lead is captured within a lanced tab formed in said lanced plate.

14. The circuit interrupter of claim 12 further including a spring clip mounted within said case and trapping said first resistor lead between said one receptacle contact member and said spring clip to insure good electrical connection between said first resistor lead and said receptacle contact member.

15. The circuit interrupter of claim 10 further including a test button extending through one of said outlet openings in said case for contacting said conducting strap to move said conducting strap into contact with a neutral terminal means in a test position.

16. The circuit interrupter of claim 15 wherein said test button is biased against a latch plate extending from said operating mechanism by a return spring to return said button to a non-test position.

17. The circuit interrupter of claim 16 wherein said test button includes an extension member for contacting with said conducting strap.

* * * * *